April 14, 1953   J. W. DUNN   2,634,809
VENETIAN BLIND TILTER
Filed Nov. 4, 1947

INVENTOR.
John W. Dunn
BY Robert Robb
Attorneys.

Patented Apr. 14, 1953

2,634,809

UNITED STATES PATENT OFFICE 2,634,809

VENETIAN BLIND TILTER

John W. Dunn, Alhambra, Calif., assignor to Cal-Alloy Castings, Inc., Glendale, Calif., a corporation Application November 4, 1947, Serial No. 783,927

3 Claims. (Cl. 160—177)

My present invention involves improvements in the general type of Venetian blind tilting devices or units such as shown by United States Patent 2,031,354 granted February 18, 1936 to Richard H. Wright. In a tilting unit of the above class there is ordinarily employed a pair of supporting brackets secured to the top of the frame of the window and one of these brackets has tilting mechanism such as shown in the prior patent above mentioned, the same generally including a worm shaft and worm housed in the bracket and engaging a gear sector which co-operates with the head bar of the Venetian blind in a suitable manner to cause tilting of the said head bar and thereby the slats of the blind incident to the rocking of the gear sector by operation of the worm and worm shaft.

My present invention involves primarily improvements in the guide means carried by the so-called tilting unit above mentioned for guiding the movement of the tilt cord which is interengaged with a pulley wheel mounted on the worm shaft of the unit.

In the assembly of Venetian blinds it is necessary to engage the tilt cord with the pulley wheel aforesaid and bring said cord into co-operation with the guide means associated with the pulley wheel so that it is the object of my invention to provide an improved form of pulley wheel by which the assembly operation above mentioned is facilitated.

In carrying out my invention I employ a peculiar formation of pulley wheel involving a notched flange at one side of the grooved portion of the wheel which receives the tilt cord, the guide means for the cord being closely disposed in relation to the periphery of the pulley wheel to prevent jumping of the cord therefrom in the manipulation of the blind and preventing any displacement of the cord from the wheel in any lateral direction in the ordinary use of said blind.

With the foregoing in mind an understanding of my invention will be had upon reference to the following detailed description, in connection with the accompanying drawings, and in the latter:

Figure 1:
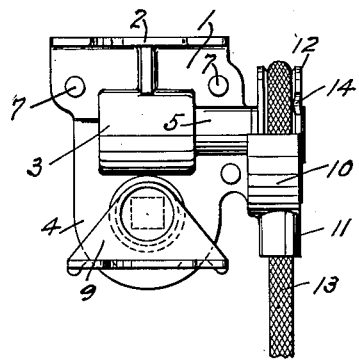
Figure 1 is a side elevation showing a tilting unit or bracket assembly, including the tilting cord arranged in operative condition thereon, illustrating the form of the pulley wheel used for the purposes of my invention.
Figure 2:
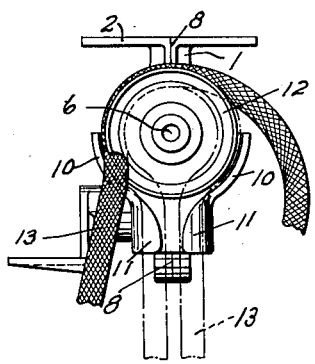
Figure 2 is a front elevation of the parts as shown generally in Figure 1 and illustrating the left end or depending portion of the pulley cord broken away and arranged as in the operation of interengaging said cord between the pulley wheel and the left hand part of the cord guide.
Figure 3:
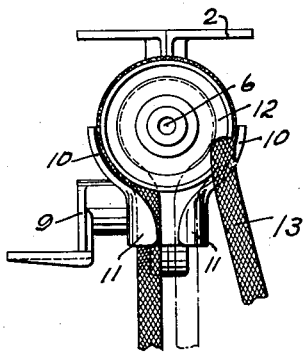
Figure 3 is a view similar to Figure 2 but showing the left hand portion of the pulley cord fully engaged with the cord guide and illustrating how the right hand portion is manipulated in the act of engaging the same between the periphery of the pulley wheel and the right hand portion of the said guide.

In Figures 1, 2 and 3 the end bracket for supporting the head rail and which is usually attached to the latter by screws is illustrated in its ordinary position of connection with the gear sector operated by the worm on the worm shaft, which latter parts are not shown because housed in the casing of the tilting unit, and because they are conventional in the art. In Figures 2 and 3 also the pulley cord in its final adjusted position in connection with the pulley wheel is shown in full or dotted lines as the case may be.

I refer first to the general construction of my tilting unit which is largely conventional in that it comprises a bracket 1 having attachment flange means 2 as customary and made up of two united sections as regards the body thereof. These sections are formed so as to afford a casing construction to house a worm at the middle portion 3, a gear sector at the lower portion 4, and the worm shaft that leads into the portion 3, at the part 5. The worm shaft is designated at 6 in the drawings. Ordinarily the unit as thus far described is made of two sections which are brought together at their meeting faces to provide the casing portions above mentioned and then held together by upsetting rivet portions designated 7. The parting line between the two sections of the bracket body 1 is designated at 8. The sector gear in the portion 4 of the body 1 coacts with the worm in the portion 3 as usual in order to obtain a tilting action of the movable bracket 9 which is secured by suitable fastening means to one end of the head rail of the Venetian blind unit, according to common practice.

I now refer to the features of construction constituting my present invention. In this connection it is notable that the sections of the bracket 1 are formed each with a guide and guard member which is designated 10, and these members are curved downwardly from an elevation about co-incident with the horizontal line passing through the axis of the shaft 6. After curving downwardly a short distance each of the members 10 extends vertically and is formed with a flange 11 of curved form in horizontal cross section. Preferably each of the members 10 with its flange 11 constitutes an integral part of one section of the bracket body 1.

On the shaft 6 there is fixed the pulley wheel 12 which is held from rotation on the shaft by any suitable means desired and this pulley wheel carried by the outer exposed end of the shaft 6 is arranged above and between the members 10 which house the wheel partially at its peripheral portion below the axial center thereof, and in a plane generally corresponding with the plane of mounting of the wheel itself.

It will be noted that the upper guard portions of the guide and guard members 10 are positioned rather closely to the periphery of the wheel so that there will be no possibility of the tilt cord 13 being displaced from the grooved portion of the wheel at its periphery, in the operation of the tilt cord for its usual function in adjusting the slats of the blind. As customary the grooved portion of the pulley wheel 12 may be roughened or ribbed in order to have a relatively fixed engagement with the cord, or to prevent slippage of the cord relatively to the pulley in the normal operation of said cord. It is noted also that the curved flanges at the outer side of the guide and guard members 10, the same designated 11, are slightly spaced at their adjacent edged portions the distance of spacing approximating that corresponding to the diameter of the cord. Thus when the ends of the cord 13, or the depending portions which extend downwardly from the pulley wheel 12 are arranged between the curved flanges 11 the said ends or downwardly extending portions will mutually coact to prevent lateral displacing movement from the space between the two flanges, in an obvious manner.

Since the groove of the pulley wheel 12 is formed between two spaced side flange portions of the wheel and the peripheries of these flanges extend quite closely to the upper guard portions of the guide and guard members 10 I have had to have recourse to a peculiar formation of the wheel 12 in order to admit of interengaging the tilt cord 13 properly with the members 12 and 10. To this end I provide in the periphery of the outermost flange of the wheel 12, as seen clearly in Figures 1 to 3 of the drawings, a notch or recess 14 the size of which is such as to permit of looping the pull cord 13 over the top of the pulley wheel 12 and engaging one end or portion of the cord 13 in the notch 14. In this manner the cord 13 is moved inwardly toward the groove of the pulley wheel 12 so that by turning the wheel slightly after such engagement as indicated in Figure 2, while the cord is between the notched portion of the outer flange of the wheel and the adjacent guard portion of one of the guide and guard members 10, said cord may be shifted to a position so that it is vertically between the flanges 11 and thus fully engaged with the pulley wheel at one side of the groove thereof. This is the operation practically depicted in Figure 2 in which the left end or dependent portion of the tilting cord 13 is illustrated as in the process of being engaged with the pulley wheel at one side of the grooved portion thereof and then brought into a position between the flanges 11 and finally to the left dotted position shown in Figure 2. Meanwhile as the above operation is effected the right dependent portion of the cord 13 may be disposed as seen in Figure 2 trailing in the top grooved portion of the wheel 12 ready for its operation to be inserted between the groove of the wheel 12 and the other one of the guide and guard members 10. The last mentioned operation is effected by turning the pulley wheel 12 in a rightward or clockwise direction as seen, from its position in Figure 2, so that the right hand portion of the tilt cord may be caused to engage in the notch 14 when the latter is disposed a short distance above the right hand guide and guard member 10, then with the cord in such position the wheel 12 may be rotated clockwise further until the notch portion is carried to a point just above the right hand flange 11 of the right hand guide and guard member 10. Then the said right hand portion of the cord 13 will be shoved between the flanges 11 of the two guide members and will assume the dotted line position as shown in Figure 3, wherein the depending ends of the cord 13 are seen as intermediate the flanges 11 and prevented from accidental disengagement because there is not sufficient space for the cord to become detached except by the application of manual pressure in effecting disengagement should it be necessary to do so.

It will be seen from the foregoing that my construction of tilting unit affords a ready means and simple means for assembling the cord for tilting upon the tilting pulley wheel 12, or removing the cord by reversing the assembling operation set forth above.

It will be understood that it is within the province of my invention to use, in lieu of the ordinary woven or fabric cord 13, what are known as ball chain cords at present commonly employed in Venetian blind usage. The ball chain cords may be applied to the pulley wheel in precisely the same method of operation as hereinbefore described in regard to the cord 13 illustrated.

Having thus described my invention, what I claim as new and desire to secure by Letters Patent of the United States, is—

1. In a Venetian blind tilter comprising a grooved pulley wheel and pulley wheel actuated head bar tilting instrumentalities, including a bracket on which the wheel is mounted and a cord to be seated in the groove of such wheel, that improvement which comprises guard members at opposite peripheral portions of the wheel spaced therefrom a less distance than that of the diameter of the cord to prevent displacing of the cord from the pulley groove, and a recess in a side of the wheel, at its periphery, and of substantially the same depth as the diameter of the said cord for receiving the cord when the wheel recess is adjusted above the guard members, said wheel being movable with the cord engaged in the said recess to carry the engaged part of the cord along and between a guard member and the pulley from one end of the guard member to the other.

2. In combination, a Venetian blind tilter including a bracket, a peripherally grooved pulley wheel thereon to receive a tilt cord in the grooved portion thereof, a guard member on the bracket spaced from the wheel periphery opposite its grooved portion a distance less than the diameter of the cord, to prevent the cord from jumping out of the said grooved portion, the pulley wheel having a portion of its periphery containing the groove notched at the side of the wheel outermost from the bracket, for a depth substantially equal to the diameter of the tilt cord.

3. Means as claimed in claim 2, in which each guard member is formed with a guide flange leading downwardly therefrom, said flanges being horizontlaly spaced less than a distance equal to double the diameter of the cord, and said cord depending at its ends from the pulley between said flanges to guide the movement of the tilt cord.

JOHN W. DUNN.

References Cited in the file of this patent

UNITED STATES PATENTS

| Number | Name | Date |
| --- | --- | --- |
| 1,733,640 | Wright | Oct. 29, 1929 |
| 2,223,997 | Lorentzen | Dec. 3, 1940 |